(12) United States Patent
Henblad et al.

(10) Patent No.: US 7,316,043 B2
(45) Date of Patent: Jan. 8, 2008

(54) COMBINED RAMP AND VEHICLE CHOCKING CONSTRUCTION

(75) Inventors: Peter Henblad, Eskilstuna (SE); Larseric Philipsson, Örebro (SE); Magnus Eek, Köping (SE); Sivert Stenkvist, Torshälla (SE); Juhani Marttiin, Kungsör (SE)

(73) Assignee: Car-O-Liner AB, Kungsor (SE)

( * ) Notice: Subject to any disclaimer, the term of this patent is extended or adjusted under 35 U.S.C. 154(b) by 203 days.

(21) Appl. No.: 11/180,722

(22) Filed: Jul. 14, 2005

(65) Prior Publication Data
US 2006/0056944 A1    Mar. 16, 2006

(30) Foreign Application Priority Data
Sep. 10, 2004    (SE)    ....................... 0402169

(51) Int. Cl.
  *E01D 1/00*    (2006.01)
  *E01D 15/00*    (2006.01)
(52) U.S. Cl. .......................... 14/69.5; 254/88
(58) Field of Classification Search ................. 14/69.5; 254/88
See application file for complete search history.

(56) References Cited

U.S. PATENT DOCUMENTS

| 1,189,632 | A | 7/1916 | Seitz |
| 1,849,964 | A | 3/1932 | Snyder |
| 4,920,596 | A * | 5/1990 | Stevens ........................ 14/69.5 |
| 6,135,420 | A | 10/2000 | Johnston et al. |
| 7,100,232 | B2 * | 9/2006 | Zhang .......................... 14/69.5 |
| 7,194,779 | B2 * | 3/2007 | Trask ........................... 14/69.5 |
| 2002/0078513 | A1 | 6/2002 | Schouest |

FOREIGN PATENT DOCUMENTS

EP    1 038 725 A    9/2000

OTHER PUBLICATIONS

Office Action dated Feb. 27, 2007 for corresponding European Application No. 05445050.7.

* cited by examiner

*Primary Examiner*—Raymond Addie
(74) *Attorney, Agent, or Firm*—Harness, Dickey & Pierce, P.L.C.

(57) ABSTRACT

A combined ramp and chocking construction for a four-wheeled vehicle can be adjusted to a first position in which the construction forms a ramp, and to a second position in which the construction provides four vehicle chocks. The construction includes four units arranged sequentially two and two in the longitudinal direction of the vehicle. Each of the units is elongate and pivotal about an axis that is perpendicular to the longitudinal direction of the vehicle. Each unit is also intended to be generally straight in the first position and generally angled in the second position, in response to rotation about their pivot axes.

10 Claims, 2 Drawing Sheets

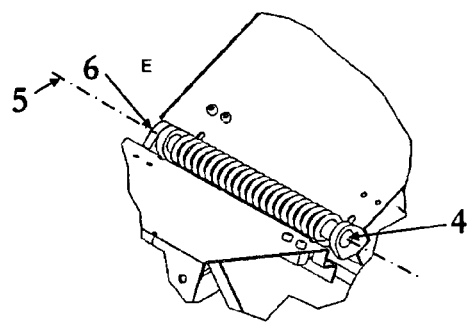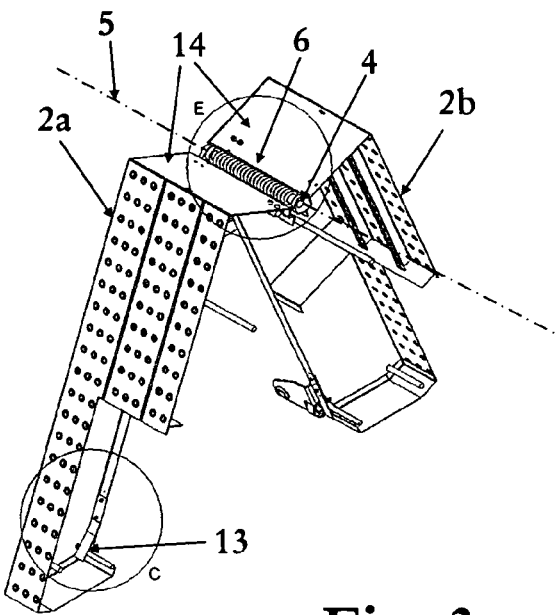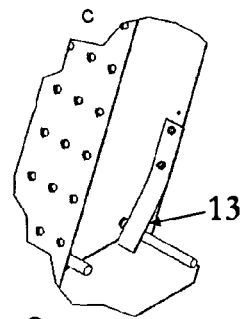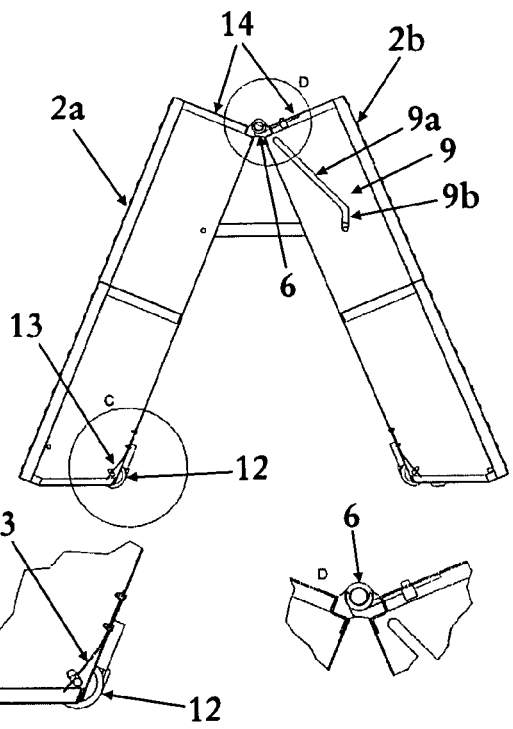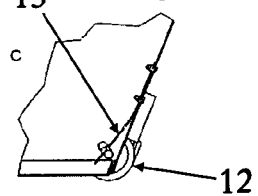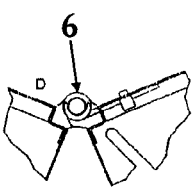
Fig. 3b
Fig. 3c
Fig. 3a
Fig. 4a
Fig. 4b
Fig. 4c

COMBINED RAMP AND VEHICLE CHOCKING CONSTRUCTION

This U.S. non-provisional application claims benefit of priority under 35 U.S.C. §119 of Swedish Patent Application No. 0402169-7, filed on Sep. 10, 2004, the entire contents of which are incorporated herein by reference.

TECHNICAL FIELD

The present invention relates to a combined ramp and vehicle chocking construction for four-wheeled vehicle which can be adjusted to a first position in which the construction forms a ramp and a second position in which the construction forms four vehicle chock, and which includes four units that are arranged sequentially two by two in the longitudinal direction of the vehicle.

Such a combined ramp and vehicle chocking construction is earlier known. Car-O-Liner AB markets a vehicle straightening bench under the trade name Mark 6 which comprises a combined ramp and vehicle chocking construction that includes rear articulated units and front moveable units. A vehicle drives up onto the construction when the construction is in its first position, i.e. the ramp position. When the front wheels of the vehicle reach the front moveable units the wheels accompany the forward movement of said units until the vehicle is stopped, when its rear wheels have reached the rear articulated units. The vehicle is raised with the aid of an elevator or lift, whereafter the units are adjusted to said second position, i.e. the vehicle chocking position. This position is reached by turning the front moveable units in a known manner, while folding together the rear articulated units.

DISCLOSURE OF THE INVENTION

One of the problems encountered with this known combined ramp and vehicle chocking construction is that the second position is extremely low. When the vehicle stands on the units in the vehicle chocking position of the construction, the vehicle is extremely close to the floor on which the construction stands. If the vehicle is to be secured to a frame on the straightening bench for complex repair work, it is necessary to fit bench parts to the frame to which the vehicle is secured. If the underside of the vehicle is to be repaired with the vehicle standing on the units in the vehicle chocking position, it must be ensured that access can be obtained. Regardless of the application concerned, the construction presents an uncomfortable working position to the user.

Another problem is that a front-wheel-drive vehicle is forced to reverse onto the construction, since the front moveable units do not allow driving of the vehicle on solely those wheels that are driven up onto the units.

These problems are resolved with a combined ramp and vehicle chocking construction of the kind described in the introduction, where each of the units is an elongate structure and pivotal or rotatable about an axis that is perpendicular to the longitudinal direction of the vehicle. Each unit is also adapted so as to be generally straight in said first position and generally angled or non-straight in said second position as a result of being rotated about its articulated joint.

The units preferably comprise two parts, wherein when seen from one side, the units will have generally the form of an inverse V, preferably a relatively acute V in the second position. Alternatively, the units are angled through 180 degrees in the second position.

The present invention enables a second position to be achieved, where the construction provides for vehicle chocking elements on which the vehicle is high above the underlying supportive surface on which the construction stands, therewith facilitating all work to be carried out on the vehicle. The units, which are generally straight in the first position in which the construction forms a ramp, are preferably horizontal and locked two and two together in the longitudinal direction. In this case, the units are immovable when a vehicle is driven onto the ramp, wherewith it is unessential whether the vehicle is a front-wheel-drive or a rear-wheel-drive. Moreover, the inventive construction allows the vehicle to continue forwards and drive off the ramp in a forward direction, instead of being forced to reverse down the ramp.

The units will conveniently include spring devices which generally take up the forces with which the weights of the units act in switching from the second position to the first position. Thus, only a relatively small force is required to switch the positions of the construction.

BRIEF DESCRIPTION OF THE DRAWINGS

The invention will be described in more detail with reference to FIGS. 1-4, which are solely meant to illustrate the invention and shall not therefore be considered to limit the scope of the invention.

FIG. 3a is a diagrammatic view of a unit included in the combined ramp and vehicle chocking construction in FIGS. 1-2, where parts have been omitted for the sake of illustration.

FIGS. 3b and 3c are enlarged views of selected parts of FIG. 3a.

FIG. 4a is a section view of the unit shown in FIG. 3a, and FIGS. 4b and 4c are enlarged views of chosen parts of FIG. 4a.

DESCRIPTION OF PREFERRED EMBODIMENTS

Figure 1:
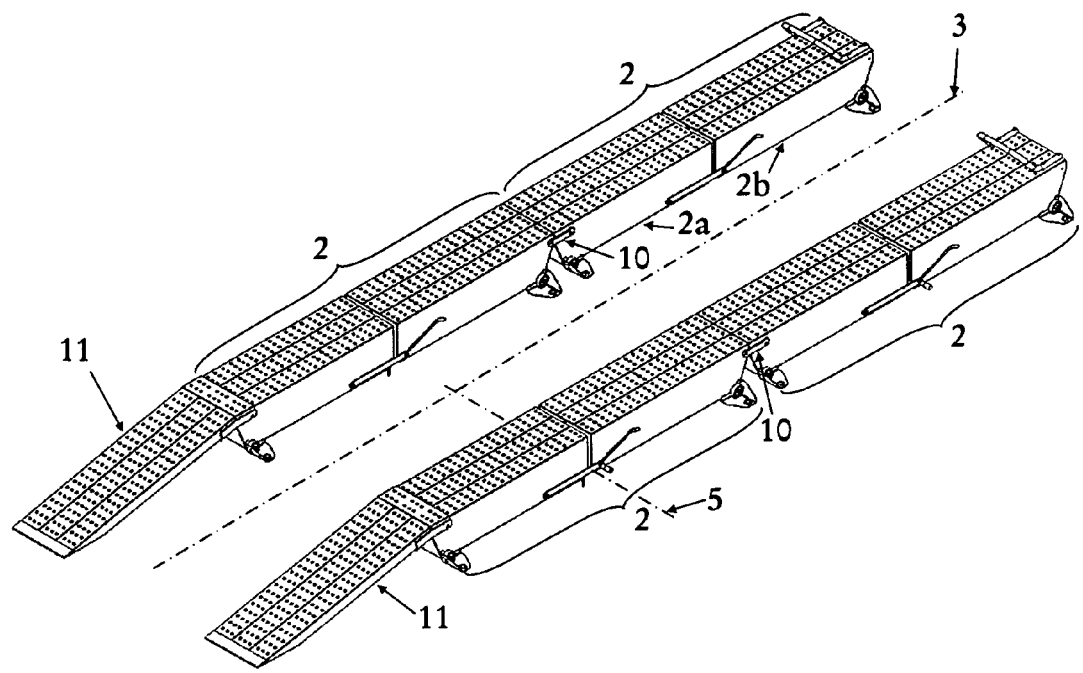
FIGS. 1-2 are diagrammatic views of a combined ramp and vehicle chocking construction in the downwardly swung ramp position and the upwardly swung vehicle chocking position respectively.
Figure 2:
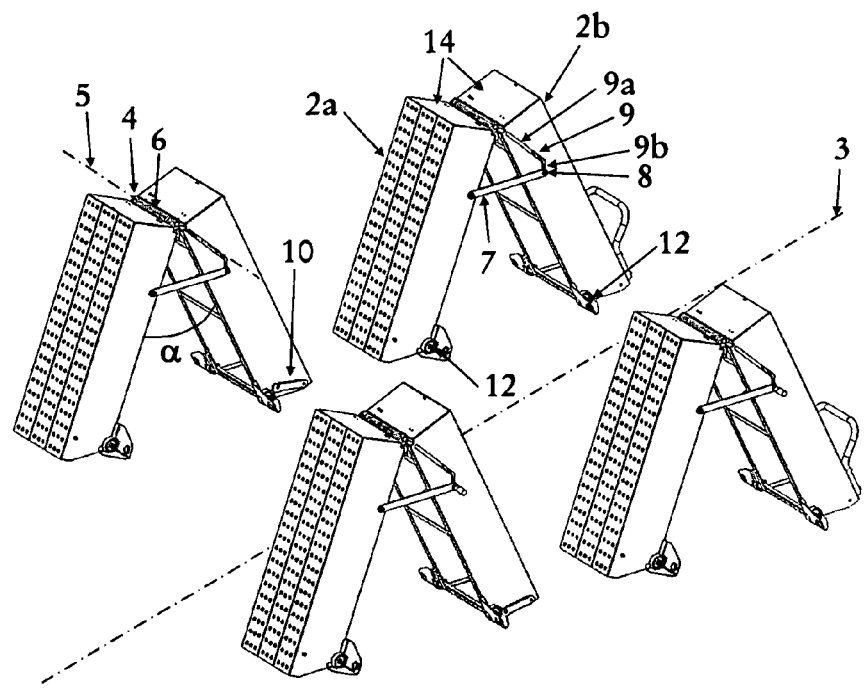

A combined ramp and chocking construction 1 for a four-wheel-drive vehicle is shown in FIGS. 1-4. The construction can be adjusted to a first, downwardly lowered position in which the construction forms a ramp, as shown in FIG. 1, and a second upwardly raised position in which the construction provides four so-called chocks as shown in FIG. 2. The first, downwardly lowered position will be referred to as a ramp position in the following text, whereas the raised second position will be referred to as a vehicle chocking position.

The construction comprises four units 2 which are arranged sequentially two by two in the longitudinal direction 3 of a vehicle situated on the construction. Each unit 2 is elongate and comprises two preferably generally hollow elements 2a-b, which are joined together by means of an articulating joint 4 so as to enable the units to pivot relative to each other about an axis 5 that extends at right angles to the longitudinal direction 3.

According to the present invention, each unit 2 is arranged to be generally straight and horizontal on a supportive surface in the ramp position, by virtue of rotation about its joints 4, and generally angled or non-straight in the vehicle chocking position. When seen from one side, each unit 2 will generally have the form of an inverse V relative to the longitudinal direction 3 in the chocking position, where the two elements define an acute angle α which is smaller than about 30 degrees. The angle is chosen to obtain a significant height of the units 2 in the chocking position on the one hand, and so that the weight of a chocked vehicle will not act at an excessively large angle on the long axis of the elements 2*a-b* on the other hand. Alternatively, each unit 2 can be angled at 180 degrees in the chocking position, i.e. the angle α is 0 degrees.

Each unit 2 also includes a spring device 6, preferably in the form of a torsion spring that is tensioned so that its spring force will generally support the force with which the weight of the unit acts when shifting from the chocking position to the ramp position. In this way, only a minimum force is required to lift the units from the ramp position to the chocking position. An enlarged view of the torsion spring 6 is shown in FIGS. 3*b* and 4*c*.

It will be understood by the person skilled in this art that other spring devices can be used to obtain a technically equivalent function.

Each unit 2 includes latching means for latching the unit in the vehicle chocking position. Such a latch may include two stays or struts 7 on respective sides of the unit 2, these struts being pivotally secured to one, 2*a*, of the elements 2*a-b*. The stays or struts 7 can be manoeuvred by means of a lever or the like that runs in slots located on respective sides of the second, 2*b*, of the elements 2*a-b* of the unit. These slots are preferably angled so that when the unit 2 is switched from the ramp position to the chocking position, the lever 8 will first run in a first part 9*a* of respective slots and thereafter in a second part 9*b* of said slots. The slot parts 9*a-b* define angles in mutually different directions with the long axis of the second element 2*b*, so as to enable the unit 2 to be moved readily from the ramp position to the vehicle chocking position and locked in this latter position by pulling up the lever. It will, of course, be apparent that the means for latching the vehicle chocking position may have a different design to that shown. Moreover, each unit may be provided with latching means for latching the unit in the ramp position.

The combined ramp and chocking construction also includes securing devices 10 for securing the units 2 sequentially, two by two, in the longitudinal direction 3. For each pair of units to be secured to one another, the securing devices may consist of hooks pivotally connected to one of the two sequentially arranged units 2. These hooks can be caused to engage pins or eyes mounted on the other of said two sequentially arranged units 2.

In order to enable a vehicle to drive up the construction in its ramp position, the construction includes two devices 11 formed by the units sideways in relation to the longitudinal direction 3 for a vehicle drive-on ramp in the ramp position of the construction. It will be understood that the remaining two units 2 may also be equipped with devices 11 which form a vehicle drive-on ramp in the ramp position of the construction, so that a vehicle is able to drive onto the ramp from any chosen direction. It will be noted that the devices 11 are not shown in FIG. 2.

Each unit 2 will conveniently include sprung wheels 12 that cause the unit 2 to roll in the longitudinal direction 3 in a non-loaded state in the chocking position of the construction, i.e. in a position in which no weight is supplied to the unit and which is held firmly against the underlying surface in a loaded state, i.e. when a vehicle is "chocked" on the construction, wherewith part of the weight of the vehicle loads the unit. This facilitates adjustment of the units when chocking a vehicle. The wheels will preferably be sprung with the aid of leaf springs 13 or the like that function to press the wheel axels down so that the wheels will be free to rotate when no load acts on the unit, this being shown in FIGS. 4*a-b*. When load acts on the units, the springs will be pressed back and the wheel axles pressed upwards, so that the wheels will no longer be free to rotate. An enlarged view of the leaf spring 13 is shown in FIGS. 3*c* and 4*b*.

Assuming that the combined ramp and vehicle chocking construction is in its ramp position, a vehicle is chocked in the following way. The vehicle is driven up onto the units 2 via the vehicle drive-on ramp 11. An elevator or lift is caused to lift the vehicle to a height that is greater than the height of the combined ramp and chocking construction in the chocking position of the construction. Securing devices 10 that secure the units sequentially, two by two, in the longitudinal direction 3 are released. Each unit 2 is then switched to the vehicle chocking position, by pulling up the levers 8 of respective units 2. The units 2 are adjusted roughly in the longitudinal direction 3 so that the respective upper V-shaped surfaces 14 will be located roughly beneath respective wheels of the vehicle, whereafter the vehicle is lowered by means of the lift. Because the units 2 are provided with said sprung wheels 12, the upper V-shaped surfaces 14 of the units 2 will co-act with the wheels of the vehicle when the vehicle is lowered, so that the units will be adjusted automatically to their correct positions.

What is claimed is:

1. A combined ramp and chocking construction for a four-wheeled vehicle, wherein the construction is adjustable to a first position in which the construction forms a ramp, and to a second position in which the construction forms four vehicle chocks, and wherein the construction includes four units arranged sequentially two and two in the longitudinal direction, characterized in that each of said units is elongate and pivotal or rotatable about an axis that is perpendicular to the longitudinal direction of the units; and in that each of said units is adapted to be generally straight in said first position and generally angled in said second position, in response to rotation about the pivot axis.

2. A combined ramp and chocking construction according to claim 1, wherein each of the units is generally comprised of two parts.

3. A combined ramp and chocking construction according to claim 1, wherein when seen from one side each of the units has the form of an inverse V in said second position relative to the longitudinal direction of the vehicle.

4. A combined ramp and chocking construction according to claim 1, wherein each of the units includes a spring means which generally absorbs the force with which the weight of the unit acts when switching from said second position to said first position.

5. A combined ramp and chocking construction according to claim 1, wherein each of the units includes a latching means for latching the unit in said second position.

6. A combined ramp and chocking construction according to claim 5, wherein each of said latching means includes at least one pivotal strut or brace which can be manoeuvred by means of a lever that runs in at least one slot in the unit provided with said latching means.

7. A combined ramp and chocking construction according to claim 5, wherein each of said slots is angled.

8. A combined ramp and chocking construction according to claim 1, comprising securing devices for securing said units sequentially, two and two, in the longitudinal direction of said vehicle.

9. A combined ramp and chocking construction according to claim 1, wherein two of said units arranged side-by-side relative to the longitudinal direction of the vehicle include means which form vehicle drive-on ramps in said first position.

10. A combined ramp and chocking construction according to claim 1, wherein each of said units includes sprung wheels which allow the unit to roll when not subjected to load in said second position and which hold the unit stationary in a unit loaded state.

* * * * *